United States Patent [19]

Reedy

[11] Patent Number: 4,616,287
[45] Date of Patent: Oct. 7, 1986

[54] ELECTRICAL POWER TRANSMISSION SYSTEM WITH BROKEN CONDUCTOR GUARD

[76] Inventor: Irving Reedy, 3560 Holliday Ave., Apopka, Fla. 32703

[21] Appl. No.: 732,266

[22] Filed: May 9, 1985

[51] Int. Cl.[4] .............................................. H02G 7/18
[52] U.S. Cl. .................................. 361/107; 174/40 R
[58] Field of Search .................. 174/5 R, 5 SG, 40 R, 174/43, 45 R; 361/107

[56] References Cited

U.S. PATENT DOCUMENTS 304,087  8/1884  Edison ........................... 361/107 X
714,355 11/1902  Armstrong ......................... 361/107

FOREIGN PATENT DOCUMENTS 6615  1/1902  Austria ............................... 361/107

OTHER PUBLICATIONS

Painton, Edgar T., *Mechanical Design of Overhead Electrical Transmission Lines*, D. Van Nostrand Company, New York, New York, 1925, pp. 219–222 as well as FIG. 139 facing p. 220, FIG. 142 facing p. 222, and FIG. 23 (mentioned on p. 221) but facing p. 65.

*Primary Examiner*—Laramie E. Askin
*Attorney, Agent, or Firm*—Duckworth, Allen and Dyer

[57] ABSTRACT

A broken conductor guard for use in an electrical power transmission system including at least one high potential power conductor positioned vertically above two neutral conductors. The broken conductor guard comprises a conductive rod electrically connected transverse to the neutral conductors. The rod extends a predetermined distance on each side of the two neutral conductors in a substantially horizontal plane such that a broken high-potential conductor will fall on the rod and be short-circuited to the neutral conductors.

6 Claims, 3 Drawing Figures

ELECTRICAL POWER TRANSMISSION SYSTEM WITH BROKEN CONDUCTOR GUARD

The purpose of the present invention is to provide an electrical power transmission system with a broken conductor guard which will prevent high voltage electrical wires that have been broken by accident or by metal fatigue from falling to the ground and remaining energized for long periods of time endangering human lives and property.

The invention includes a device, which when attached to neutral wires in a span between supporting poles of an overhead electric distribution line or transmission line, will establish and provide a low resistance path to to neutral for the electric current to follow. When an energized phase conductor wire inadvertently breaks and falls across the device, abnormally high electrical current flow will cause upstream protective overload fuses to blow, or will signal power circuit breakers to open, thus de-energizing the faulted conductor and protecting from injury or death anyone who might come into physical contact with the fallen conductor.

During the past history of overhead high voltage electric power line operation, thousands of people and domestic animals have been killed and thousands more have been seriously injured by electric shock from conductors which have mechanically failed, fallen on high resistance sand or rock and remained energized for long periods of time. The conductors remain energized because the resistance to electric current flow of the return path to the electrical neutral is so high that insufficient current flows in the faulted conductor wire to cause protective fuses to blow, or in the case of main feeder circuits, to signal the power circuit breaker to open and de-energize the line.

Many advantages of the present invention will become apparent by reference to the following description taken in conjunction with the accompanying drawings in which.

Figure 1:
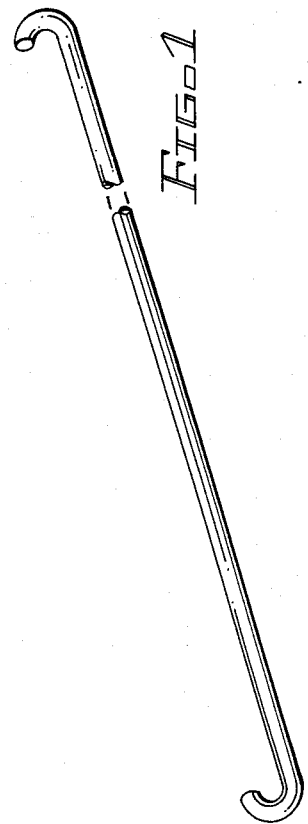
FIG. 1 illustrates a broken conductor guard in accordance with the present invention.

As shown in FIG. 1, the device is a rod fabricated from hard drawn copper or aluminum alloy metal. The rod is of large enough diameter to support the weight of a conductor or conductors. The ends of the rod are turned upwards and back towards the center to prevent a fallen conductor from sliding off. The length is sufficient to extend approximately six inches farther out from the neutral than the alignment of the outside energized conductors. For this reason the length of the rod will vary from approximately two feet for a single phase (one single energized conductor) to approximately twelve feet for a three phase line employing wooden crossarms for conductor support. In other words, the length of the rod will vary depending upon the specific type of line design. The longer rods also would be larger in diameter. The rods will be placed two or more to a span and at a distance from the poles which would afford optimum opportunity for a falling conductor to make contact with a rod.

Figure 2:
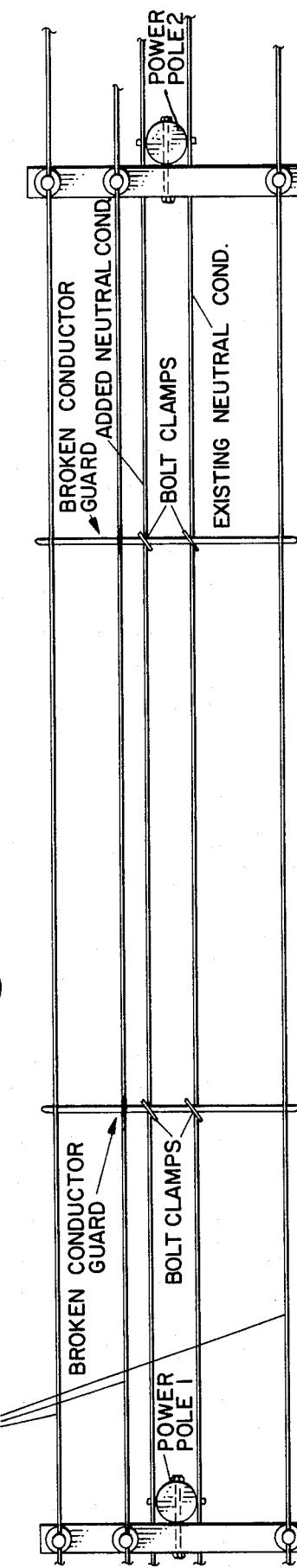
FIG. 2 illustrates a top plan view of typical power lines in conjunction with broken conductor guards.
Figure 3:
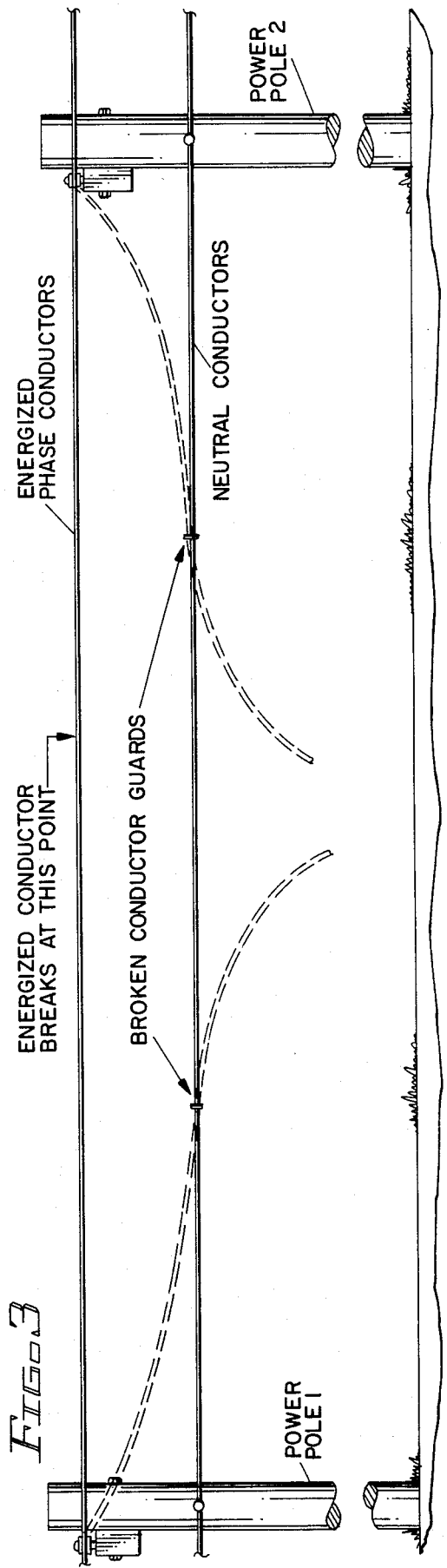
FIG. 3 illustrates an elevation view of power lines having a broken line contacting broken conductor guards.

FIG. 2 shows a typical arrangement of the entire system in plan view, and FIG. 3 illustrates the performance of the devices in elevation or side view.

I claim:

1. In an electrical power transmission system for above ground transmission of electrical power utilizing at least two high-potential power lines positioned vertically above a first neutral potential line which is attached to a power pole, the improvement comprising:

a second neutral potential line attached to the power pole, said second neutral potential line being parallel to and displaced horizontally from the first neutral potential line for establishing a neutral plane below the high-potential power lines, the horizontal distance between the first and second neutral potential lines being less than the distance between the high-potential power lines;

an electrically conductive rod connected transversely to and supported by the first and second neutral potential lines, said rod extending horizontally beyond each neutral potential line, whereby a broken high-potential power line above said rod will contact said rod when falling vertically;

clamping means attaching said rod to each of the first and second neutral potential lines; and means for capturing a falling line on said rod.

2. The system of claim 1 wherein said means for capturing a falling line include upwardly curved ends on said rod.

3. The system of claim 1 including spaced poles for supporting the high-potential power lines and the neutral potential lines above ground level, a plurality of said rods being positioned between adjacent ones of the poles such that at least one rod will be contacted by a vertically falling high-potential power line.

4. The system of claim 1 including more than two high-potential power lines positioned vertically above the neutral potential lines, said rod extending on either side of the neutral potential lines a distance sufficient to be at least directly below each of the high-potential power lines.

5. In an electrical power transmission system including at least one high-potential power conductor positioned vertically above two neutral conductors attached adjacent to a power pole, a broken conductor guard comprising a conductive rod electrically connected to and oriented transversely with respect to the neutral conductors and extending a predetermined substantially horizontal distance on each side thereof such that a broken high-potential power conductor will fall on said rod and be short-circuited to the neutral conductors.

6. The system of claim 5, wherein said rod includes upturned curved ends for capturing a falling high-potential power conductor.

* * * * *